United States Patent Office
3,579,383
Patented May 18, 1971

3,579,383
PROCESS FOR ACTIVATING METAL FOIL FOR USE AS A POSITIVE ELECTRODE IN ALKALINE STORAGE BATTERIES
Trevor Stanley Turner, Kidderminster, England, assignor to The International Nickel Company, Inc., New York, N.Y.
No Drawing. Filed July 16, 1969, Ser. No. 842,347
Claims priority, application Great Britain, Aug. 2, 1968, 37,095/68; Apr. 3, 1969, 17,617/69
Int. Cl. H01m 35/30, 43/04
U.S. Cl. 136—76                                    9 Claims

ABSTRACT OF THE DISCLOSURE

Process for activating a metal surface, e.g., nickel foil, for use as the positive electrodes in alkaline storage batteries, in which the foil is immersed in a bath containing a nickel ammine complex and then made the anode in an electrolytic treatment during which current is passed through the bath to deposit the battery active mass on the metal. A high capacity activated metal foil is also disclosed.

---

The present invention is directed to the preparation of positive electrodes suitable for use in alkaline storage batteries.

Activated sintered nickel plates have found wide application as positive electrodes in alkaline storage batteries. However, because sintered nickel plates are porous and have diffused bonds, they are not characterized by a strength and ductility comparable to that of a dense, thin sheet material. It has been recognized that a thin, activated metal foil, for example, nickel foil, is potentially a superior positive electrode material because, by employing such foil, the final size of a storage battery may be substantially reduced. Further, batteries having activated foil electrodes are able to produce very high discharge rates for short periods at a substantially constant potential. This property is in contradistinction to the discharge of a capacitor which, though capable of a high dischargre rate, exhibits a potential which decays exponentially with time.

One method for activating the surface of nickel foil by forming on the surface thereof a "battery active mass," is described in U.S. Patent No. 3,441,440, issued Apr. 29, 1969. In the method described in the patent, nickel foil is activated in order to render it suitable for use as an electrode in an alkaline storage battery by anodic corrosion in a solution of an electrolyte, while it is in contact with an inert, porous, electrically non-conducting membrane. This method is quite slow; for example, in ten hours, the film of active mass formed may only have a capacity of 0.050 mah./cm.$^2$ (milliampere hours per square centimeter). Another investigator, by a different technique wherein the battery active mass was also obtained by corroding the foil, achieved a remarkably high capacity of 2.5 mah./cm.$^2$. However, such an electrode cannot be cyclically charged and discharged in a battery without shedding the active mass from the foil. Further, it will be understood that the strength of the foil may be seriously impaired by processes which require corrosion of the foil.

It has now been discovered that the surfaces of a conducting foil, such as nickel foil, can be activated by an anodic treatment in an electrolyte containing a nickel ammine complex.

It is an object of the present invention to provide sturdy, light-weight activated conducting foil, such as nickel foil, having a high capacity when used as positive electrodes in alkaline storage batteries.

Another object of the invention is the provision of an anodic deposition process for activating nickel foil which does not corrode the foil.

Other objects and advantages will become apparent in the following description.

Generally speaking, the present invention contemplates activating a solid conducting surface, and more particularly, a solid nickel surface, in order to render it suitable for use as an electrode in an alkaline storage battery by anodic treatment in an aqueous solution of nickel ammine complex. In this process partially oxidized (i.e., charged) battery active mass is deposited or formed from the solution and this active mass, which is the black form, NiO(OH), is substantially adherent to the solid nickel surface.

The nickel surface activated in accordance with the invention can be, for example, nickel foil, an expression which as used herein, refers to essentially non-porous nickel material having a thickness less than about 1 mm. Foil produced by rolling may be as thin as 0.1 mm. Foil made by electroforming may be as thin as 0.006 mm. A composite foil may be formed, for example, by deposition from nickel carbonyl on a thin substrate of copper, steel or other suitable material.

Suitable solutions of nickel ammine complexes to form the electrolyte may be prepared by the addition of ammonia to aqueous solutions of nickel acetate, nickel sulphate, nickel chloride or nickel nitrate. Nickel nitrate has been found to be most advantageous because of its high solubility, so that high solution concentrations can readily be obtained. We prefer to keep the concentration above 100 g./l. (grams per liter) of $Ni(NO_3)_2 \cdot 6H_2O$, and up to the saturation point. Within this range, it is advantageous to work at from 800 to 1000 g./l.; above 1000 g./l., crystallization may tend to occur, and below 800 g./l., the efficiency of the process falls off. The ratio of ammonia to nickel (grams-molecules to grams-ions) is of substantial importance in this process and should be maintained at a value between 0.1 to 3, and a ratio of about 2.75 has been found quite advantageous. The above range of ratios is applicable when the current density during anodic activation of the foil lies in the advantageous range of from 10 to 50 ma./cm.$^2$. It is to be understood that the activation process will not occur with electrolytes composed of nickel formate or nickel sulphamate which have an oxidation breakdown potential which is less than that required for activation.

The temperature of the solution is an important factor in the process. While the process of the invention is operable at and below room temperature (e.g., even at 0° C. it proceeds, though very slowly), it has been found that better results are obtained at somewhat higher temperatures. A temperature of 35° C. is about the maximum temperature which can be used, since temperatures above this tend to drive off the ammonia and thus alter the $NH_3/Ni^{2+}$ ratio of the electrolyte; an advantageous operating range of temperatures is from about 20° C. to about 30° C.

The current density employed in treating the foil should fall in the range from 0.1 ma./cm.$^2$ (milliamperes per square centimeter) to 1000 ma./cm.$^2$. Below 0.1 ma./cm.$^2$ no formation of battery active mass can readily be detected. Accordingly, a more advantageous lower limit on the current density range is 10 ma./cm.$^2$. As for the higher end of the current density range, it is generally desirable to operate at a current density of 500 ma./cm.$^2$ or less, since above this value there is such a high evolution of oxygen that the process is made unattractive. Advantageously, the current density should lie in the range from 10 to 50 ma./cm.$^2$.

The time of treatment may range from as short as 5 minutes to 2 or 3 or more hours. In general, the longer treatment times have produced higher capacities, but even the longer treatment times of several hours are still relatively short in comparison to the times required in conventional processes.

For the purpose of giving those skilled in the art a better understanding of the invention, the following illustrative examples are given. In Examples I through IV a standard electrode of 1/8" thickness is employed in order to provide a ground standard surface for ease of reproducibility.

EXAMPLE I

An electrolyte was prepared containing 750 g./l. $Ni(NO_3)_2 \cdot 6H_2O$ and 150 ml./l. of 0.880 ammonia. The $NH_3/Ni^{2+}$ ratio of the electrolyte was 0.92. Pure nickel sheet, 1/8" thick, was subjected to anodic treatment in this electrolyte at room temperature for 6 minutes at a current density of 0.06 a./cm.$^2$. The sheet was then removed, washed and transferred to 30% w./w. potassium hydroxide solution at room temperature; it was then cycled twice, each cycle involving charging at 0.01 a./cm.$^2$ until oxygen was evolved, and then discharging at 0.01 a./cm.$^2$ until the potential of the plate was zero with respect to a mercury oxide reference electrode. The capacity of the plate was 295 $\mu$ah./cm.$^2$.

In the above example the ammonia to nickel ratio is relatively low. In the examples which follow, the ammonia to nickel ratios are substantially higher, that is, over 2, and the treatment is carried out for periods longer than 1 hour, at a somewhat higher temperature and at lower current density than in the first example. It will be noted that markedly higher capacities are achieved in the following examples.

EXAMPLE II

An electrolyte was prepared containing 815 g./l. $Ni/NO_3)_2 \cdot 6H_2O$ and 0.880 ammonia sufficient to give a ratio of $NH_3/Ni^{2+}$ equal to 2.56. Pure nickel sheet, 1/8" thick, was subjected to anodic treatment in this electrolyte at 27.6° C. for 96 minutes at a current density of 18 ma./cm.$^2$. The deposited film adhered to the sheet. The sheet was then removed from the electrolyte, washed and transferred to 30% w./w. potassium hydroxide solution at room temperature; it was then cycled twice, each cycle involving charging at 10 ma./cm.$^2$ until oxygen was evolved, and then discharging at 10 ma./cm.$^2$ until the potential of the plate was zero with respect to a mercury oxide reference electrode. The capacity of the plate was 0.750 mah./cm.$^2$ (milliampere hours per square centimeter at a discharge current of 0.2 ma./cm.$^2$.

EXAMPLE III

The procedure of Example 1 was repeated, except that the temperature of the solution was 35° C. The capacity of the plate was found to be 1.170 mah./cm.$^2$ at a discharge current of 0.2 ma./cm.$^2$.

EXAMPLE IV

An electrolyte was prepared containing 800 g./l. $Ni(NO_3)_2 \cdot 6H_2O$ and sufficient 0.880 ammonia to give a ratio of $NH_3/Ni^{2+}$ of 3.0. Pure nickel sheet, 1/8" thick, was subjected to anodic treatment in this electrolyte at 35° C. for 120 minutes at a current density of 25 ma./cm.$^2$. The deposited film adhered to the sheet. The sheet was then removed from the electrolyte washed and transferred to 30% w./w. potassium hydroxide solution at room temperature; it was then cycled twice, each cycle involving charging at 10 ma./cm.$^2$ until oxygen was evolved, and then discharging at 10 ma./cm.$^2$ until the potential of the plate was zero with respect to a mercury oxide reference electrode. The capacity of the plate was 1.77 mah./cm.$^2$ at a discharge current of 0.4 ma./cm.$^2$.

In the following example, a perforated nickel foil is activated and tested.

EXAMPLE V

An electrolyte was prepared containing 825 g./l. $Ni(NO_3)_2 \cdot 6H_2O$ and sufficient 0.880 ammonia to give a ratio of $NH_3/Ni^{2+}$ equal to 2.75. A perforated nickel foil sheet having the dimensions 5 cm. x 5 cm. x 0.006 mm. thick and a hole area amounting to 10% (the perforations in the foil facilitate the flow of the current through the electrolyte in a stacked plate) was subjected to an activating anodic treatment in this electrolyte at 30° C. for 120 minutes at a current density of 20 ma./cm.$^2$. Both sides of the foil sheet were simultaenously activated and the deposited film adhered to the sheet. The sheet was then removed from the electrolyte, washed and transferred to 30% w./w. potassium hydroxide solution at room temperature; it was then cycled twice, each cycle involving charging at 10 ma./cm.$^2$ until oxygen was evolved and then discharging at 10 ma./cm.$^2$ until the potential of the plate was zero with respect to a mercury oxide reference electrode. The capacity of the plate at the two hour discharge rate was 54 ma. hours, that is, 1.2 mah./cm.$^2$. The discharge current was 25 ma., that is, 0.55 ma./cm.$^2$.

It has thus been demonstrated that very high capacities can now be achieved and the foil plates charged and discharged without shedding the battery active mass. A useful battery active mass can be obtained in as little as 5 minutes of anodic treatment. The thickness of the deposit of the active mass will usually range up to 0.004 inch. It will be understood that additional battery active mass can be deposited on the foil by continuing the treatment, but if the treatment is continued for periods longer then about 3 hours, but it will tend to shed when the electrode is discharged. If the surface of the foil electrode is wrapped or otherwise mechanically supported, more battery active mass may be deposited on its advantageously than would be desirable if the foil were free-standing, since shed battery active mass will in fact be retained on the surface of the wrapped or supported foil and, although not actually adherent thereto, will still provide valuable capacity.

The present invention is particularly applicable to the processing of nickel foil to activate the nickel foil for subsequent use as positive eletrodes in alkaline storage batteries. Batteries using the activated nickel foil of the invention, due to the fact that such foil is thin, have very large plate area per unit volume. Such batteries of high capacity can be of small size and advantageously replace high capacitors, since they have greater electrical output with a very high discharge rate.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and appended claims.

I claim:
1. A process for activating a solid non-porous conducting surface for use as a positive electrode in alkaline storage batteries which comprises, establishing a bath containing a nickel ammine complex in solution by introducing ammonia into an aqueous solution of a nickel salt selected from the group consisting of nickel acetate, nickel sulfate, nickel chloride and nickel nitrate, maintaining the bath at a temperature from about room temperature to a temperature not exceeding about 35° C., introducing the solid conducting surface into the bath as an anode and passing current sufficient to produce a current density on the anode of at least 0.1 milli-ampere per-square centimeter for a period of at least 5 minutes to deposit a battery active mass of NiO(OH) on the said conducting surface.

2. The process of claim 1 wherein the solid conducting surface is composed of nickel.

3. The process of claim 1 wherein the solid conducting surface is provided by nickel foil and the bath is prepared by introducing into a solution containing from about 800 to 1000 grams per liter of [Ni(NO$_3$)$_2$·6H$_2$O] sufficient ammonia to provide a ratio of gram-molecules of ammonia to gram-ions of nickel in the range from 0.1 to 3, and the current density employed is in the range of from about 10 to 50 milli-amperes per square centimeter.

4. A process for activating nickel foil which comprises establishing a bath containing a nickel ammine complex by introducing ammonia into an aqueous solution of a nickel salt selected from the group consisting of nickel acetate, nickel sulfate, nickel chloride, and nickel nitrate, maintaining the bath at a temperature from about room temperature to a temperature not exceeding 35° C., immersing the nickel foil in the bath as an anode and passing current sufficient to produce a current density on the anode in the range from 10 to 1000 milli-amperes per square centimeter for a period of at least 5 minutes to deposit a battery active mass of NiO(OH) on said foil.

5. The process of claim 4 wherein the ratio of gram-molecules of ammonia to gram-ions of nickel in the bath is at least 0.1 and the temperature of the bath is in the range from about 20° C. to 30° C.

6. The process of claim 5 wherein the ratio of gram-molecules of ammonia to gram-ions of nickel is no greater than about 3.

7. The process of claim 5 wherein the ratio of gram-molecules of ammonia to gram-ions of nickel is about 2.75.

8. The process of claim 7 wherein the current density on the anode is less than about 500 milliamperes per square centimeter.

9. The process of claim 1 wherein the nickel salt is nickel nitrate.

References Cited
UNITED STATES PATENTS

| | | | |
|---|---|---|---|
| 1,402,751 | 1/1922 | Edison | 136—29 |
| 3,184,338 | 5/1965 | Mueller | 136—75 |
| 3,281,272 | 10/1966 | Ackermann et al. | 136—29 |
| 3,335,033 | 8/1967 | Kober | 136—29 |
| 3,441,440 | 4/1969 | Silverstone | 136—29 |

ALLEN B. CURTIS, Primary Examiner

A. SKAPARS, Assistant Examiner

U.S. Cl. X.R.

117—130; 136—29; 204—56